United States Patent [19]
Huspeni et al.

[11] Patent Number: 5,091,464
[45] Date of Patent: Feb. 25, 1992

[54] POLYMER COMPOSITIONS HAVING IMPROVED MOLDING CHARACTERISTICS

[75] Inventors: Paul J. Huspeni, North Augusta, S.C.; Richard Layton, Augusta; Paul D. Frayer, Martinez, both of Ga.

[73] Assignee: Amoco Corporation, Chicago, Ill.

[21] Appl. No.: 629,826

[22] Filed: Dec. 19, 1990

Related U.S. Application Data

[63] Continuation of Ser. No. 451,366, Dec. 15, 1989, abandoned, which is a continuation of Ser. No. 255,623, Oct. 11, 1988, abandoned.

[51] Int. Cl.$^5$ .............................................. C08L 67/03
[52] U.S. Cl. .................................... 524/539; 525/444
[58] Field of Search ...................... 525/444; 524/539

[56] References Cited

U.S. PATENT DOCUMENTS 4,563,508  1/1986  Cottis ................................. 525/444

*Primary Examiner*—Patricia Short
*Attorney, Agent, or Firm*—Matthew R. Hooper; William H. Magidson; Ralph C. Medhurst

[57] ABSTRACT

Disclosed are novel blends of fully aromatic copolyesters which comprise (a) 1-19 parts by weight of a polyester comprising recurring moieties of dihydroxybenzene, nonvicinal benzene dicarboxylate, para oxybenzoate to (b) 1 part by weight of a polyester comprising recurring moieties of diphenol, nonvicinal benzene dicarboxylate, para oxybenzoate; wherein the polyester (a) has a melting point in the range of about 340 C. to 400 C., a crystallization temperature of from about 300-340 C., and a crystallization rate of at least 1,000 counter per minute. The blends display improved surface properties, particularly improved blistering resistance.

4 Claims, 3 Drawing Sheets

FIGURE 1 - Compositions expressed as mole percent of the following three components: poly(p-oxybenzoate) = PHBA, poly(p-phenyleneterephthalate) = HQ/T, poly(p-phenyleneisophthalate) = HQ/I.

FIGURE 2 – Compositions expressed as mole percent of the following three components:
poly(p-oxybenzoate) = PHBA,
poly(4,4'-biphenyleneterephthalate) = BP/T,
poly(4,4'-biphenyleneisophthalate) = BP/I.

ized under a load of 264 psi.
POLYMER COMPOSITIONS HAVING IMPROVED MOLDING CHARACTERISTICS This is a continuation of application Ser. No. 451,366, filed Dec. 15, 1989, now abandoned, which in turn is a continuation of U.S. Ser. No. 255,632 filed Oct. 11, 1988, now abandoned.

FIELD OF THE INVENTION

Novel blends of wholly aromatic polyesters are described; they are comprised of (a) 1–19 parts by weight of a first polyester comprising recurring moieties of dihydroxybenzene, nonvicinal benzene dicarboxylate, paraoxybenzoate to (b) 1 part by weight of a second polyester comprising recurring moieties of diphenol, nonvicinal benzene dicarboxylate, para-oxybenzoate.

The instant compositions are easy to melt-fabricate and yield injection molded parts that surprisingly show a significantly decreased tendency to blister. In addition, the materials display improved mechanical properties; composites containing about 30 weight percent of glass fibers have heat distortion temperatures (HDT's) of at least about 240° C. when measured under a load of 264 psi.

BACKGROUND OF THE INVENTION

Wholly aromatic polyester resins have long been known. For instance, 4-hydroxybenzoic acid homopolymer and copolymers have been provided in the past and are commercially available. Such polymers commonly are crystalline in nature, relatively high melting or possess a decomposition temperature which is below the melting point, and when molten, frequently exhibit orientation in the melt.

The homopolymer of p-hydroxybenzoic acid is a very high melting, insoluble material and, hence, very difficult to fabricate. Melting points as high as 610° C. were quoted—see W. J. Jackson, The British Polymer Journal, December 1980, p. 155. In order to depress the high melting point of the homopolymer so as to make it melt fabricable, a variety of materials incorporating different types of comonomers were prepared over the years.

One such material is, for example, the resin made from p-hydroxybenzoic acid, isophthalic and/or terephthalic acids and 4,4'-biphenol as described in, for example, Cottis et al., U.S. Pat. Nos. 3,637,595 and 3,975,487. The polymer has outstanding high temperature properties; it can be molded to give articles of high modulus and strength. It is offered commercially by Amoco Performance Products, Inc. under the trade name of Xydar.® Cottis U.S. Pat. No. 4,563,508 discloses that the molding properties of a polyester can be improved by adding minor amounts of similar polyarylates in which the terephthalic acid moiety has been wholly or partially replaced by isophthalic acid. However, Cottis does not disclose or suggest the addition of a tetra polyarylate of the type disclosed herein.

Recent work at Amoco resulted in the preparation of 1–19 parts by weight of a first polyester comprising recurring moieties of dihydroxybenzene, nonvicinal benzene dicarboxylate, para-oxybenzoate to 1 part by weight of a second polyester comprising recurring moieties of diphenol, nonvicinal benzene dicarboxylate, para-oxybenzoate. The preferred mole ratio of monomers in each polyester is depected in the triangular diagrams of FIG. 1 and FIG. 2, respectively, and is described in the Definition of the Invention. The polymers melt in the range of from about 300° to about 420° C. Of particular interest are the first polyesters falling into the two areas A and B of FIG. 1. These latter products were found to form a stable oriented melt phase at 340° to 400° C.; the melt phase is tractable and can be extruded below its decomposition temperature to form high modulus and high strength fibers, films and molded articles displaying a good retention of properties at high temperatures. Materials filled with 30 weight percent of glass fibers have heat distortion temperatures of from about 240° to about 280° C., under a load of 264 psi. Moreover, the polymers grouped in areas A and B have crystallization temperatures in the range of from 300° to 340° C.; and their crystallization rates are at least 1000 counts per minute and up to 3500 counts per minute as measured by X-ray techniques. The polyesters shown in the aforementioned areas A and B are the subject of commonly assigned U.S. patent application, entitled "Hydroquinone Poly(iso-terephthalates) Containing Residues of p-Hydroxybenzoic Acid", Serial No. 225,670, filed concurrently with the present application hereby incorporated by reference.

While the overall combination of properties of the above resins is outstanding, they may form molded parts that show undesirable blistering (i.e., raised areas).

It has now been discovered that the addition of the 1–19 parts by weight of a first polyester comprising recurring moieties of dihydroxybenzene, nonvicinal benzene dicarboxylate, para-oxybenzoate to 1 part by weight of a second polyester comprising recurring moieties of diphenol, nonvicinal benzene dicarboxylate, para-oxybenzoate wherein said units are present in specified proportions yields alloys in which the tendency to blister is substantially reduced or eliminated.

With some known exceptions, mixtures of polymeric materials are generally immiscible. That is, they consist of domains of chemically distinct phases. Usually, one component forms a continuous phase, while the other component forms roughly spherical domains as inclusions. Under some circumstances, bi-continuous structures are also obtainable. Mixing two arbitrarily chosen polymers usually results in inferior materials having no utility, since in the absence of adhesion between phases, the dispersed phase merely weakens the continuous phase. Some polymeric products, such as the wholly aromatic polyesters, exhibit an ordered structure in at least some regions of the polymer. This order can exist in one, two or three dimensions. The incorporation into blends of polymers exhibiting an ordered structure leads to an increased tendency of the blends to separate into phases. This is believed to be due to the fact that the order found in certain regions of the resin causes a fairly sharp boundary between the domains of the molecules of the component polymers. Hence, blends including such polymers would be expected to exhibit a significant reduction in properties.

It should be noted, however, that many useful blends whose morphology and phase interaction are favorable, are known.

Takayanagi et al., U.S. Pat. No. 4,228,218, disclose a polymer composition comprising 20 percent or less, based upon the total weight of polymeric material, of a first rigid polymer with the balance being a second polymer composed substantially of flexible molecular chains. An approximate borderline between rigid and flexible molecular chains is a Mark-Houwink Index of 1, those above being rigid and those below being flexible.

The first polymeric material is dispersed in the second polymeric material in a microscopic region of 1 μm or less. It is believed that wholly aromatic polyesters would be characterized by those skilled in the art as rigid molecules within the context of the above cited patent. The patent does not disclose blends of two or more polymers having rigid chains as does the present invention with improved blister resistance.

Blends of polymers exhibiting orientation in the melt with other polymers were investigated. Mixtures of liquid crystalline polyesters with poly(alkylene terephthalates), polycarbonates and polyarylates were described in Cincotta et al., U.S. Pat. Nos. 4,408,022 and 4,451,611; Froix, U.S. Pat. Nos. 4,489,190 and 4,460,735; and in Kiss, European Patent Application No. 169,947. Improved mechanical properties were found with these materials. The addition of a particulate liquid crystal polymer to poly(butylene terephthalate) or other thermoplastic polymers was described as a method to obtain compositions with enhanced resistance to melt dripping during burning—see Kim et al., U.S. Pat. No. 4,439,578. In several instances, e.g. in alloys of liquid crystalline polyesters with an aromatic sulfone polymer (Froix et al., U.S. Pat. No. 4,460,736) with an aromatic poly(ester amide) (Kiss, U.S. Pat. No. 4,567,227), and with poly(arylene sulfides) (Froix, U.S. Pat. No. 4,276,397) improved mechanical characteristics and improved processibility (lower viscosity) of the non-anisotropic resin were noted. Better properties were also obtained by blending two particular liquid crystalline polyesters—see, for example, Froix, U.S. Pat. No. 4,267,289.

Liquid crystalline materials, including polyesters, were used to decrease the viscosity and improve the processibility of a number of other resins, including fluorinated polyolefins—see Bailey et al., U.S. Pat. No. 4,417,020; Cogswell et al., U.S. Pat. Nos. 4,429,078 and 4,438,236; and George et al., U.S. Pat. No. 4,650,836.

In one instance (Baily et al., U.S. Pat. No. 4,508,891) it was claimed that the addition of an isotropic resin to an anisotropic resin leads to a decrease of anisotropy in the corresponding molded articles.

No reference is known which is directed to the improvement of surface properties (i.e. blistering) by blending two polymers having orientation in the melt. As indicated earlier, alloys of materials having ordered structures would be expected to have reduced properties. Hence, the instant discovery was highly surprising and totally unexpected.

THE INVENTION

It was discovered that blends comprising
(a) about 1 to about 19, preferably about 1.5 to about 9 parts by weight of a first polyester comprising units (I), (II), (III) and (IV)

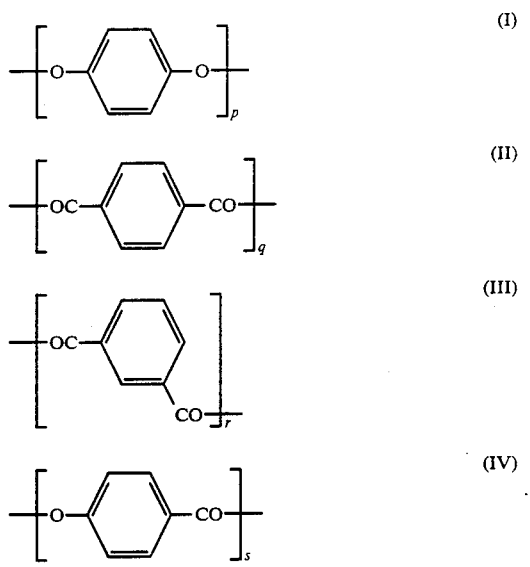

where p is approximately equal to q+r; q is the range of from 0 to about 0.76; r is in the range of from 1.00 to about 0.24; s is in the range of from about 0.18 to about 9.0; and where said first polyester has a melting point of from about 300° to about 420° C.; and (b) about one part by weight of a second polyester comprising (V), (VI), (VII) and (VIII)

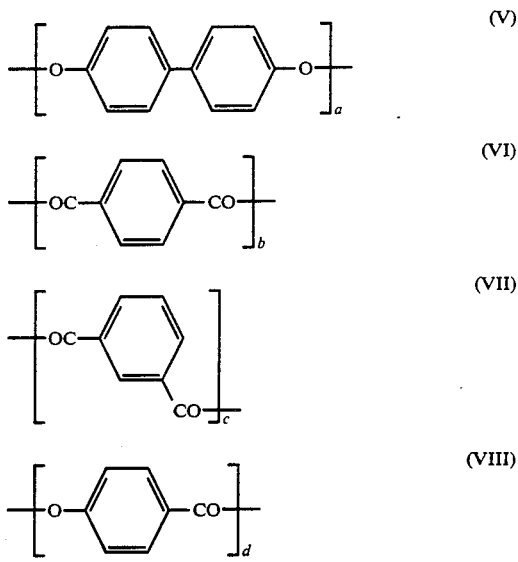

where a is approximately equal to b+c; b is in the range of from about 0.5 to about 0.8; c is in the range of from about 0.5 to about 0.2; and d is in the range of from about 1 to about 7; preferably from about 2 to about 4.

The molecular weights of said polyester blend being in the range of from about 2,000 to about 200,000, are easy to melt fabricate and yield injection molded parts that surprisingly show a significantly decreased tendency to blister. In addition, the materials display improved mechanical properties over those of the constituent polymers, as well as improved processibility; composites containing about 30 weight percent of glass fibers, have heat distortion temperatures (HDT's) of at least 240° C., when measured under a load of 264 psi.

Figure 1:
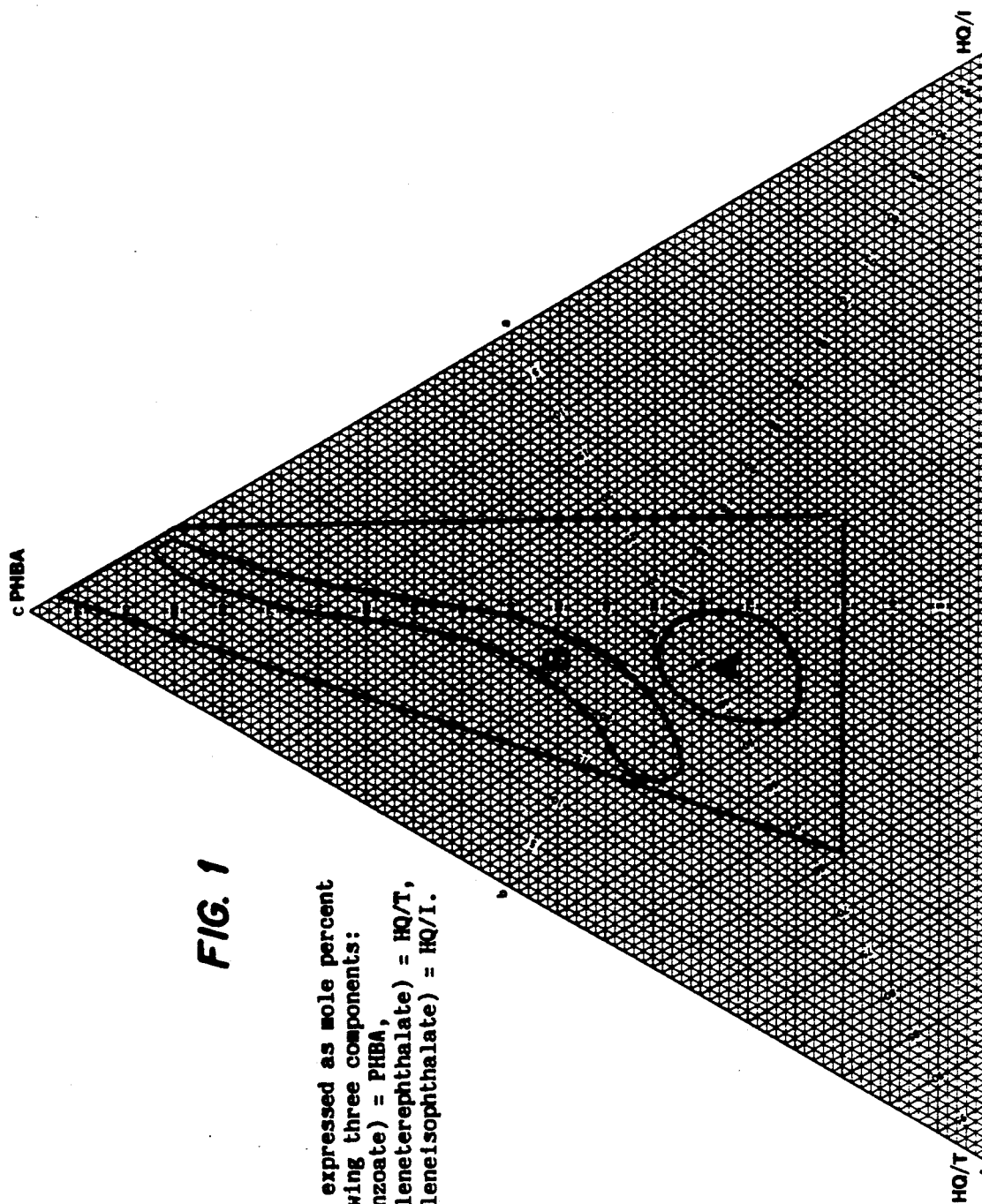
FIG. 1 is a phase diagram showing preferred compositional regions A and B for wholly aromatic polyester (a) as described below.
Figure 2:
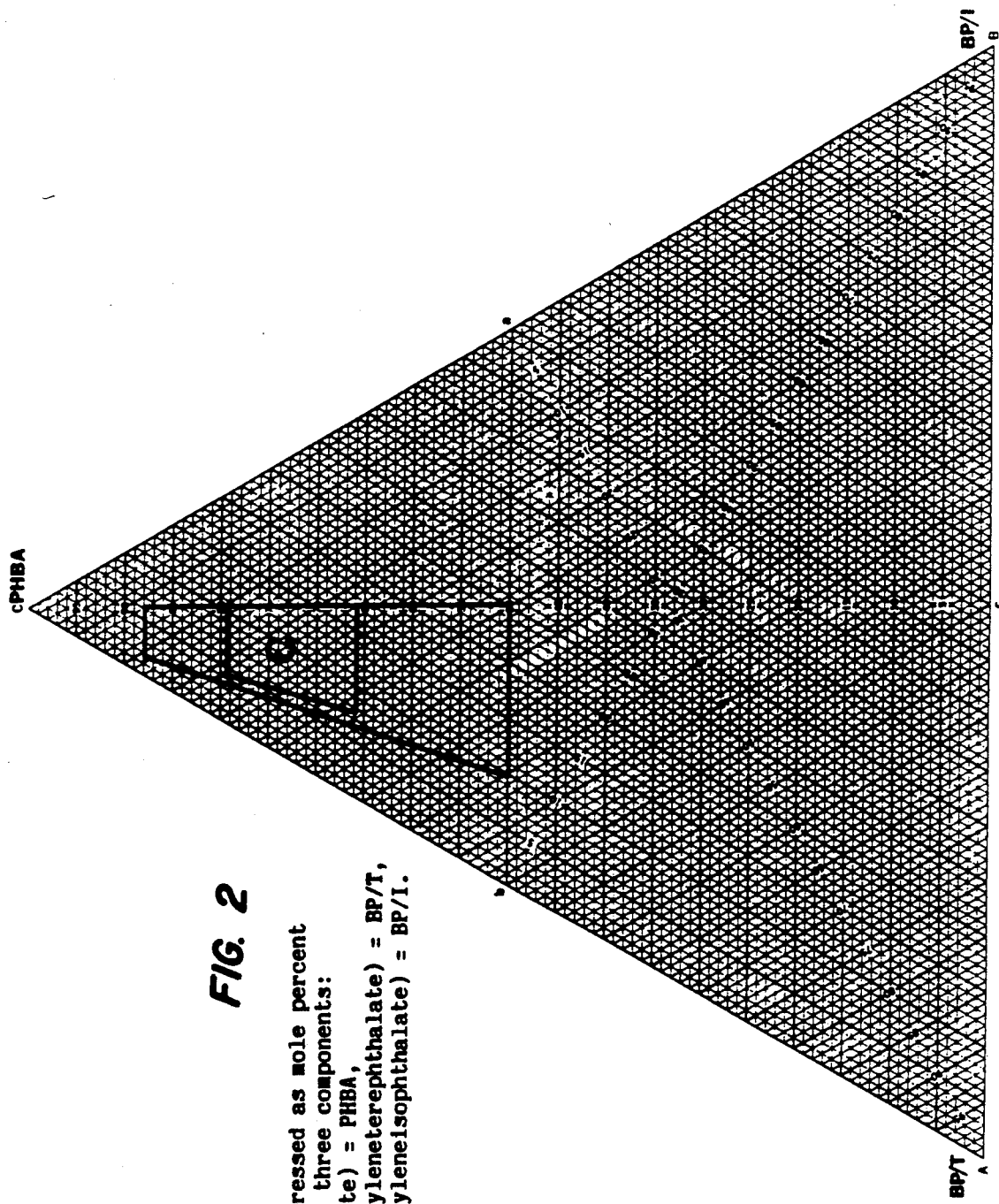
FIG. 2 is a phase diagram showing preferred compositional region C for wholly aromatic polyester (b) as described below.

The compositions corresponding to the wholly aromatic polyester (a) and (b) blends are plotted on the triangular diagrams FIG. 1 and FIG. 2. The coordinates for each point of these areas define a copolyester in terms of molar percentages of monomer units. Parameters p, q, r, and s; and a, b, c, and d can then be calculated from the above using methods known in the art. Those materials that are grouped into areas A, B, and C are preferred. The polymers of the two areas A and B (FIG. 1) are characterized in that (1) they are melt processible below their decomposition temperatures; (2) their melting points are in the range of 340° to 400° C.; (3) their crystallization temperatures are in the range of 300° to 340° C.; (4) their rates of crystallization are at least 1000 counts per minute; and (5) they yield composites having heat distortion temperatures under a load of 264 psi of about 240° to about 280° C., when filled with 30 percent by weight of glass fibers. Materials corresponding to area C (FIG. 2) have been defined above.

The phenomenon of blistering is known. Blisters may occur near a surface or in the bulk of the sample. Here, we are mainly concerned with surface blisters; note, however, that small internal blisters or voids are also detrimental to material performance.

Moldings based on polymers that show orientation in the melt, display skin-core effects. Hence, phenomena observed in these systems are often analogous to those encountered in coatings and composites. In composites, for example, blistering and delamination occur especially between two layers of different composition. In coatings, blistering is known to be a localized delamination at an interface; it depends on the diffusion of chemicals such as water and degradation by-products. The difference in the thermal expansion coefficient between a coating and the substrate can create stresses and may weaken the interface. A blister may then form with less pressure difference, due to volatiles, than in cases where these stresses are absent.

In summary thus, blistering is due to a surface layer delamination and can be caused either by trapped volatiles or by built-in stresses. Most probably both factors are at work.

Two types of blistering are encountered with polymeric materials; (1) molding blisters and (2) oven blisters. Blisters which occur during molding generally indicate the presence of degraded material. Quite often parts having acceptable surface characteristics are obtained upon molding. However, when these parts are treated at high temperatures for a certain period of time, blisters ("oven blisters") often appear. These do not necessarily indicate the presence of degraded material as a result of molding.

It is of paramount importance that molding of the polymer does not yield parts having a blistered surface. It should be noted that the configuration of a part is also quite often a factor in mold blistering. In any event, if molding blisters are detected upon visual examination, the part will generally blister to a considerably greater extent when exposed to heat treatment. Thus, the particular molding compound is most probably of inadequate quality. If, on the other hand, a good looking molding part is obtained, there is no assurance as to what the results of "oven testing" will be. For high temperature applications, it is imperative that oven blistering be also either absent or significantly minimized. The oven test and the method of blister rating are described in the "Experimental."

The blends of the instant invention show a considerably decreased tendency to blister—both during molding and in the oven test.

The synthesis of the polyesters of the second polyester of the instant invention is described in detail in Cottis et al., U.S. Pat. No. 3,637,595 entitled "P-Oxybenzoyl Copolyesters" and in Finestone, U.S. Pat. No. 4,742,149 entitled "Production of Melt Consistent Aromatic Polyesters"; the disclosure of the aforementioned two patents is incorporated herein by reference.

The bulk condensation of aromatic polyesters is described in the patent literature and broadly considered involves an alkanoylation step in which a suitable dicarboxylic acid, hydroxybenzoic acid and diol are reacted with an acid anhydride; a prepolymerization step in which the reaction product of the first step is polycondensed to prepare a prepolymer; and the prepolymer is thereafter heated in a third step to produce a polycondensate of the desired degree of polymerization.

Thus, in somewhat greater detail, the instant copolyesters are prepared by charging into the reactor the required amounts of isophthalic and terephthalic acids, p-hydroxybenzoic acid and hydroquinone or 4,4'-biphenol. An anhydride of a lower, preferably a $C_2$ to $C_4$ monocarboxylic acid, is added in at least stoichiometric amounts. It is most preferred to use acetic anhydride; its amount is preferably from about 5 to about 20 mole percent over that required for the acetylation of all of the hydroxyl groups. The acetylation reaction takes place at about 140° C. for a period of time of from about 2 to about 6 hours. The reaction mixture is then heated to about 240°–320° C. at a rate of from about 20° to about 40° C. per hour, and is kept at about 240° to 320° C. for approximately a few minutes to about 4 additional hours. The obtained low molecular weight polymer is then solid state advanced to the required high molecular weight by heating to a temperature of from about 10° to about 90° C., below the melting point of the wholly aromatic polyester for a period of from about 1 to about 24 hours.

A preferred variant as described in Finestone, U.S. Pat. No. 4,742,149, comprises adding a salt, particularly an alkaline earth metal salt or an alkali metal salt, preferably potassium sulfate, during the preparation of the resin and, particularly to the prepolymer melt prior to advancement of the final product to the desired degree of polymerization. The incorporation of stabilizing amounts of phosphites, as described in Cottis, U.S. Pat. No. 4,639,504 is also advantageous.

The polyesters of the present invention commonly exhibit

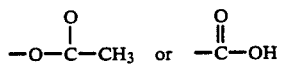

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenyl ester

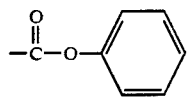

or methyl ester

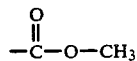

optionally may be included at the end of the polymer chains.

The polymers may be annealed below their melting points for a period of time; or the polymers may be oxidatively crosslinked to at least some degree, if desired, by heating in an oxygen-containing atmosphere (e.g., in air) while in bulk form at a temperature below their melting points for a limited period of time (e.g., for a few minutes).

The polyesters of the present invention tend to be substantially insoluble in all common polyester solvents such as hexafluoroisopropanol and o-chlorophenol, and accordingly are not susceptible to solution processing. They can surprisingly be readily processed by known melt processing techniques as discussed hereafter.

The polyesters of the present invention commonly exhibit weight average molecular weights of about 2,000 to about 200,000, preferably about 10,000 to about 50,000 and most preferably about 20,000 to about 25,000. These molecular weights are determined by techniques that do not involve solutioning of the polymer, e.g., by end-group determination, and the like.

As previously discussed, it is known in the art that blends of two polymers tend to exhibit phase separation, with a concomitant reduction in properties, due to the incompatibility of the polymers, i.e., the formation of domains. However, besides having improved blister resistance, unexpected and surprising results are achieved with the blends of the present invention. It has been observed that there is generally no significant reduction in mechanical properties of the blends when compared to the weighted average of the mechanical properties of the components. In fact, within certain compositional ranges there is an increase in properties, such as in the flexural modulus and strength, indicative of a compatibility between the components of the blends.

In preparing the blends of the present invention, the individual components are commonly provided in the form of chips, pellets or powders. Each of the components is weighed separately, and the components are physically mixed together in any appropriate apparatus, e.g., a ball mill. The physical mixture can be then dried if desired, preferably under vacuum or in a circulating air oven, although any other suitable apparatus can be used. The purpose of the drying step is to remove water from the physical mixture so as to prevent degradation. After the mixture of the solid polymer particles (which, optionally, may also contain reinforcing filler, fiber, and the like—vide infra) has been dried, the blend can be prepared. A convenient method of forming the blend is melt extrusion. The extrusion apparatus thoroughly mixes the polymers in the melt and then extrudes the blend in the form of a strand which, upon solidification, can be broken up into chips or pellets.

The instant alloys can be melt processed in the substantial absence of polymer degradation to form a variety of relatively stiff shaped articles, e.g., molded three-dimensional articles, fibers, films, tapes, etc. The addition of the second polyester (b) to the first hydroquinone based polyester (a), has the additional unexpected effect that the viscosity of the alloy is decreased and its melt-fabricability, as indicated by the lowered injection molding stock temperatures, (see Experimental), is significantly improved. The blends are suitable for molding applications and may be molded via standard injection molding techniques. Unlike similar materials commonly encountered in the prior art, it is not essential that more severe injection molding conditions (e.g., very high temperatures), compression molding, impact molding, or plasma spraying techniques be utilized.

Articles may also be molded from a molding compound which includes, as one component, the blend of the present invention. Such a molding compound incorporates into the blend of the present invention approximately 1 to 50 percent, preferably approximately 10 to 30 percent, by weight, based upon the total weight of the molding compound, of a solid filler and/or reinforcing agent. Representative fibers which may serve as reinforcing media include glass fibers, asbestos, graphitic carbon fibers, amorphous carbon fibers, synthetic polymeric fibers, aluminum fibers, aluminum silicate fibers, oxide of aluminum fibers, titanium fibers, magnesium fibers, rock wool fibers, steel fibers, tungsten fibers, cotton, wool, and wood cellulose fibers, etc. Representative filler materials include calcium silicate, silica, clays, talc, mica, polytetrafluoroethylene, graphite, alumina trihydrate, sodium aluminum carbonate, barium ferrite, etc. Molding compounds of interest in ovenware applications are described in commonly assigned U.S. patent application, entitled "Novel Plastic Ovenware Compositions", Ser. No. 255,753 filed concurrently with the present application.

EXAMPLES

The following examples serve to give specific illustration of the practice of this invention but they are not intended in any way to limit the scope of this invention.

A. Experimental Procedures

The following procedures were used to obtain the data given in the examples.

A.1. Compressive Flow (CF)

The term Compressive Flow (CF) as used in this application is a measure of the flow of a weighed sample when pressed on a Carver press at 5000 pounds. It is also an indirect measure of the polymer molecular weight; the higher the CF value at a given temperature, the lower is the molecular weight of the wholly aromatic polyester.

CF is measured from the area of a disc obtained from a sample of powdered material of given weight, usually 0.5 to 1.0 grams which has been pressed between two parallel plates. In carrying out the determination of this characteristic, a sample is pressed between two sheets of aluminum foil which in turn are backed by chromium plated steel plates 6"×6"×¼". A Carver 2112-X Model No. 150-C hydraulic press modified for 800° F. is used to press the sample. The particular temperature of the press is that indicated in each sample run. The sample material is allowed to stand for five minutes between the plates at holding pressure in order that the temperature of the material can equilibrate with the press temperature. A load of 5000 pounds is then applied for two minutes. The CF is then calculated on the following basis. The area of the pressed molding compound is measured by cutting an aluminum sandwich out of the sample pressed between the two aluminum foil sheets. The aluminum foil has a known area/weight relationship called the foil factor. The area is normalized for the pressure of the applied load and that number is multiplied by 100 to give a number greater than 1. The compressive flow is then calculated by means of the following equation:

$$CF = \left[ \frac{\left| \frac{\text{Wt. of circle(sandwich)} - \text{wt. of sample}}{\text{Foil wt. factor}} \right|^2}{\text{Applied Load (Kg)} \times \text{wt. of sample}} \right] \times 100$$

A.2. X-ray Measurements (a) Apparatus

X-ray diffraction data were obtained using a Philips XRG-3000 X-ray generator equipped with a vertical diffractometer, a long, fine focus copper X-ray tube, a Paar HTK-10 high temperature diffractometer attachment and a Paar HTK-Heat Controller. Diffractometer position is controlled by computer, which also measures and records radiation count rate produced by sample crystallinity and sample temperature.

b) Determination of the Polymer Melting Point

A sample of the polymer is submitted to a preliminary x-ray diffraction scan between 15 and 25 degrees two-theta angle by increasing the temperature by increments of 60° C. within a temperature range from about 200° to about 480° C. This allows determination of the approximate temperature at which the peak located at approximately 19.7 degrees two-theta (4.50 Angstroms d-spacing) reaches its minimum value, i.e., an approximate melting point. A second-degree polynomial equation is derived from the above data; this polynomial equation now allows to follow the peak angle as the sample temperature is varied. The temperature at which the peak height reaches a minimum (i.e., touches the baseline) is considered to be the melting point. The polymer sample is now heated and cooled at a rate of 100° C. per minute between the previously-mentioned temperature limits, and its melting point is determined. Since the melting point of a crystalline material often changes on heating and cooling (due to recrystallization, further polymerization, etc.) the sample is cooled and reheated. This allow determination of the melting point on the second heating cycle. Generally, the second cycle yields a melting point which remains approximately constant if additional heating or cooling cycles are performed. Therefore, the value obtained in the second heating cycle is taken as the polymer melting point.

c) Crystallization Temperature (Onset of Crystallization)

The onset of crystallization is measured in the same manner except that the scanning (for details, see above), is performed while the sample is cooled at 100° C. per minute. The temperature at which the peak emerges from the baseline during the second cooling cycle is considered as the onset of crystallization.

d) Crystallization Rate

At every temperature below the sample melting point, the intensity of X-ray diffraction of a crystalline material can be expressed as counts per second (or any unit of time). The increase in the number of counts per unit of time while the sample is being cooled at a certain rate (100° C. per minute) is therefore proportional to the rate of crystallization. A temperature interval starting at the onset of crystallization and 40° C. below that temperature was arbitrarily chosen. Rates of crystallization are expressed as the increase in counts per minute for a sample cooled within these temperature limits during the second cooling cycle.

A.3. Blister Rating

Samples to be tested are preconditioned at 20°-25° C., 50±5 percent relative humidity, for 24 hours. Test sample lot normally includes 5 tensile bars (⅛"thick), 5 HDT bars (5"×½"×¼" thick) and 5 flex bars (5"×½"×⅛" thick). The samples are carefully inspected and any existing cracks and/or blisters are circled. The samples are then annealed in an oven which has been equilibrated at 232° C. (450° F.), for a period of four hours. They are then removed, cooled and inspected. Rating codes follow:

0—no new blisters;
1—very slight blistering (one or two very small blisters);
2—slight blistering (three to six small blisters);
3—moderate blistering (a few large blisters and/or many small blisters); and
4—heavy blistering (many large or small blisters covering more than half of the specimen surface).

The numerical blister rating is calculated using the equation $$R = \frac{1}{n} \sum_{i=1}^{n} X_i^2$$

where
R = numerical blister rating (0-16)
n = number of samples tested
$X_i$ = blister rating of sample i (0-4).

In the above calculation the individual ratings for the entire set of test samples (tensile bars, HDT bars, flex bars) are generally treated as a single population. The ratings vary within the range of 0 (no blistering) to 16 (severe blistering, worst case).

A.4. DMA Flexural Modulus

The measurement is performed using a Dupont Dynamic Mechanical Analyzer (DMA), Model 982 in conjunction with a thermal analyzer, Model 1090. The DMA measures changes in the viscoelastic properties of materials as a function of time and temperature. Tests are conducted at a heating rate of 5° C. per minute. When the run is complete, the stored data is analyzed; the storage modulus (very similar to the flexural modulus) and the loss modulus are calculated and plotted as a function of temperature. The modulus is expressed in GPa's and the temperature in ° C. Conversion into psi's is performed using the equation:

$$Modulus\ (psi) = Modulus\ (GPa) \times (1.45 \times 10^5)$$

A.5. Injection Molding Stock Temperature

This temperature is determined by setting up the molding machine as if to perform an actual injection molding. The nozzle is pulled away from the mold injection port, the melt shot is ejected and collected; as quickly as possible, a small melt thermocouple probe (⅛″ diameter or less) is inserted into the center of the molten sample and the temperature is recorded. The procedure is repeated twice and the highest temperature is taken as the injection molding stock temperature.

A.6. Miscellaneous

The flexural strength of the experimental samples was measured according to the procedure of ASTM D-790-84A; HDT (DTUL) data were obtained using the method described in ASTM D-648.

B. Preparative Examples

B.1.

Preparation of polyester (a) having the following molar composition: 0.4 moles Isophthalic Acid/0.6 moles Terephthalic Acid/0.5 moles p-Hydroxybenzoic Acid/1.0 moles Hydroquinone.

The following ingredients were combined in a manner described.

| Item | Ingredient | Amount |
|---|---|---|
| A | Terephthalic acid | 5.311 Kg |
| B | Isophthalic acid | 3.541 Kg |
| C | p-Hydoxybenzoic acid | 3.680 Kg |
| D | Hydroquinone | 5.868 Kg |
| E | Acetic Anhydride | 15.645 Kg |
| F | Magnesium acetate tetrahydrate | 0.46 gram |
| G | Triphenyl phosphite | 7.36 gram |

Items A through F were charged into a 15-gallon, oil heated vessel equipped with an anchor type stirrer, reflux condenser, after condenser, injection port, and distillate receiver. After purging with nitrogen, the contents were heated with stirring to 141° C. and held under reflux at that temperature for 3 hours. Distillation was then started while increasing the temperature over a 4.8 hour period at 285° C. Item G was then injected into the vessel. After an additional 15 minutes the contents of the vessel were transferred to a sigma blade mixer that had been preheated to 320° C. After mixing for 4 hours at this temperature under an atmosphere of nitrogen, the mixer was cooled to near room temperature where the contents were removed as a granular solid.

The melting point of the polymer (X-ray) was 359° C.; its crystallization temperature was 336° C. with a crystallization rate of 2400.

B.2.

Preparation of Polyester (b) having the following Molar ratio: 0.25 mole Isophthalic Acid/0.75 mole Terephthalic Acid/3.0 mole p-Hydroxybenzoic Acid/1.0 mole 4,4′-Biphenol.

A mixture of
184 lbs of terephthalic acid;
61 lbs of isophthalic acid;
612 lbs of low ash p-hydroxybenzoic acid;
275 lbs of 4,4′-biphenol;
868 lbs of acetic anhydride; and
40.1 gms (88.5 ppm) of Magnesium acetate tetrahydrate was placed in a 325 gallon reactor and heated with stirring until distillation started. The reactor was held at this temperature for three hours. Distillation was started, and the temperature increased until 400 lbs of distillate had been collected. The contents were pressured into a 200 gallon reactor and the temperature was increased at a rate of 30° C. per hour until the contents reached 313° C. Then the contents were poured into a mechanical mixer and mixed at 290 to 300° C. for 5 hours. Six batches of polymers were made with compressive flows at 330° C. from 55 to 74, and each polymer had very good color.

C. The Preparation and Properties of Polyester Blends

C.1. General

Polyesters (a) and (b), prepared as described in preparative examples B.1 and B.2, were formulated into a 30 percent glass filled composition, compounded, and pelletized. The blends contained as a percentage of the resins phase, either 0, 10, 21, or 40 weight percent of polymer (b). The formulations were compounded and pelletized on a 25mm diameter Berstorff twin screw extruder. The barrel profile temperature for compounding was:

| | |
|---|---|
| Barrel zone 1 = | 320–325° C. |
| Barrel zone 2 = | 355–362° C. |
| Barrel zone 3 = | 355–376° C. |
| Barrel zone 4 = | 365–395° C. |
| Barrel zone 5 = | 380–400° C. |
| Barrel zone 6 = | 370–380° C. |
| Barrel zone 7 = | 360–370° C. |
| Die = | 355–380° C. |

The screw rpm was 170 to 175; the output was 12 to 15 pounds per hour. The above materials were molded on a 75 ton, 3 oz. Newbury injection molding machine. The barrel profile was:
rear zone—about 377° C.;
front zone—about 382° C.;
nozzle—about 388° C.

The mold temperature was set at 121° C., and the injection pressure was in the range of 1,000 to 1,360 psi. The molding machine screw rpm was about 330.

Figure 3:
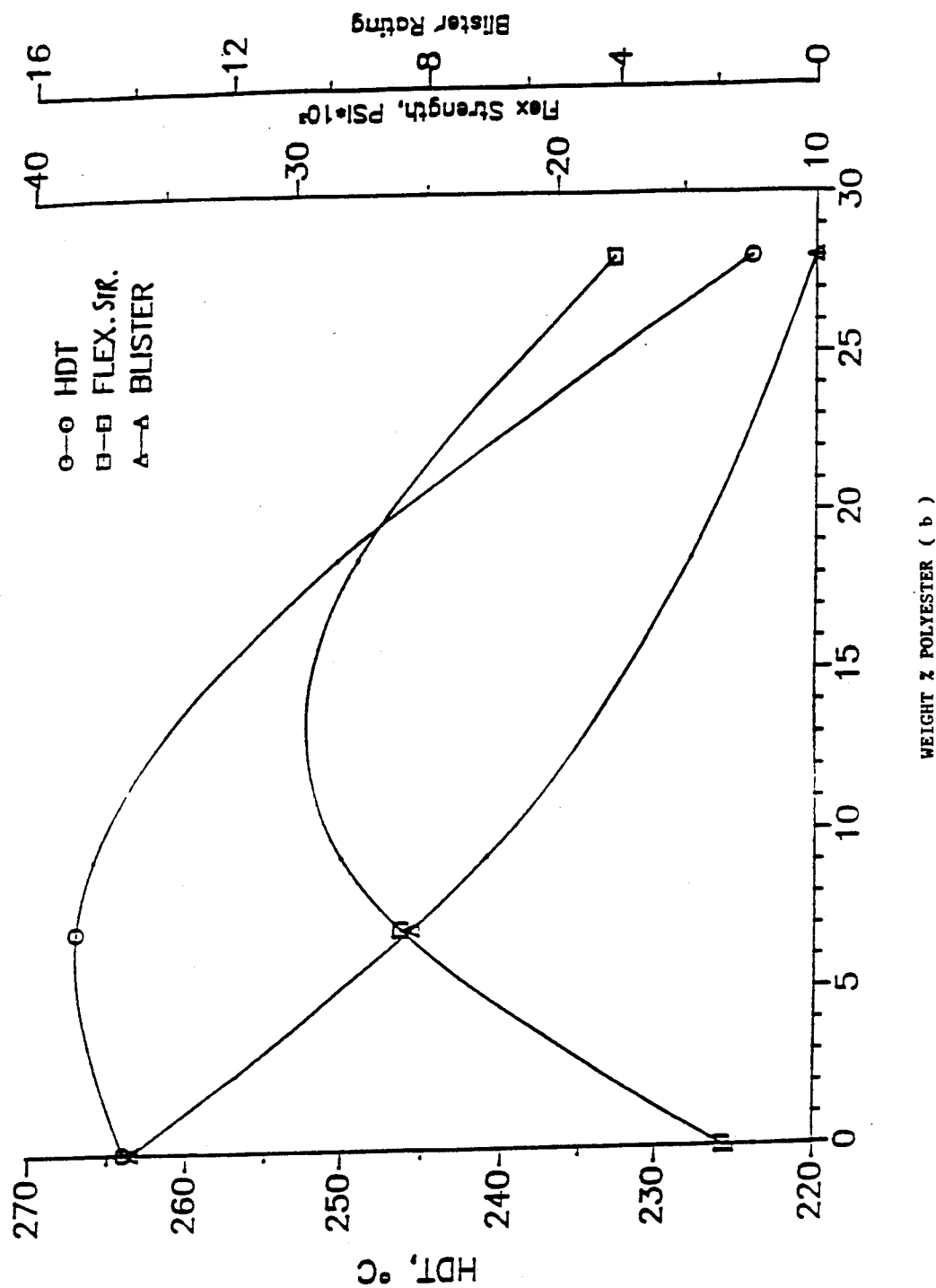
FIG. 3 graphically depicts the effects of vary the relative wt % concentration of polyester (a) versus polyester (b) in the blends of the present invention upon heat distortion temperature, flexural strength and blister resistance.

The results are summarized in Table I, and presented graphically in FIG. 3. It is apparent that the addition of only 10 weight percent (based on total resin) of polymer (b) results in a dramatic increase in flexural strength and room-temperature flexural (DMA) modulus, relative to the 30 weight percent glass filled formulations where either the polyester (a) or polyester (b) constitute 100 percent of the resin phase. This is an unexpected result and may indicate compatibility between (a) and (b). Most importantly, however, we note, a significant decrease in blister rating; at about 20 weight percent of polyester (b), blistering has practically disappeared. Also, the processibility of the blend is improved as indicated by the lowering of the injection molding stock temperature.

TABLE I

| | Composition (Wt. %) | | % wt (b) Resin Phase | Injection Molding Stock Temp (°C.) | HDT (°C.) | Blister Rating[2] | Flexural Strength psi | Flexural Modulus (DMA) psi × 10^(6)[4] at | | | |
|---|---|---|---|---|---|---|---|---|---|---|---|
| | | Glass Fiber[1] | | | | | | 20° C. | 200° C. | 250° C. | 300° C. |
| No. | (a) | (b) | | | | | | | | | |
| 1 | 100 | — | — | 0 | 446 | 250 | 15 | 18,500 | 2.03 | 0.83 | 0.57 | 0.36 |
| 2 | 70 | — | 30 | 0 | 433 | 264 | 13.9 | 13,380 | 2.25 | 0.83 | 0.52 | 0.31 |
| 3 | 63 | 7 | 30 | 10 | 420 | 267 | 8.2 | 25,800 | 2.65 | 0.97 | 0.62 | 0.35 |
| 4 | 55 | 15 | 30 | 21 | 390 | 261 | 0.07 | 28,480 | 2.39[4] | 0.85 | 0.54 | 0.29 |
| 5 | 42 | 28 | 30 | 40 | 379 | 224 | 0 | 17,680 | 2.02 | 0.53 | 0.29 | 0.10 |
| 6 | 0 | 70 | 30[3] | 100 | 358 | 272 | 0 | 24,070 | 1.97 | 0.95 | 0.78 | 0.42 |

[1] Henry and Frick, untreated 3016 (1.16") chopped glass fiber.
[2] Blister rating: 0 = best; 16 = worst.
[3] Based on OC497 glass roving (Owens-Corning).
[4] Value at 30° C.

We claim:

1. Fully aromatic polyester blends comprising 1–19 parts by weight of a polyester (a) comprising the following recurring units:

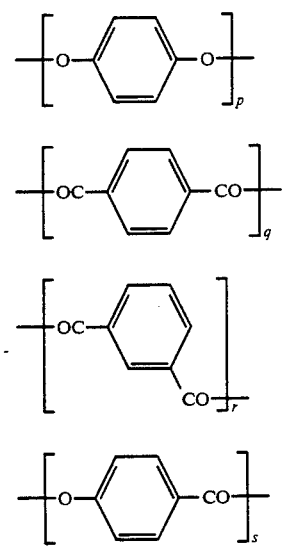

wherein the subscripts p, q, r and s are numbers representing the relative molar amounts of units (I), (II), (III) and (IV), respectively in the polyester; and wherein p is approximately equal to q+r; q is in the range of from about 0 to about 0.76, r is in the range of from about 1.00 to about 0.24, and s is in the range of from about 0.18 to about 9.0, and said polyester having a melting point in the range of from about 340° C. to 400° C., a crystallization temperature of from about 300° C. to 340° C. and a crystallization rate of at least about 1000 counts per minute; to 1 part by weight of a polyester (b) comprising the following recurring moieties:

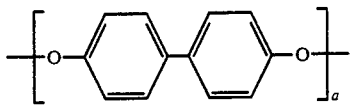

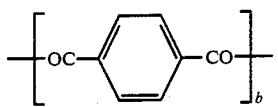

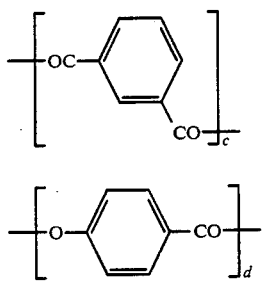

wherein a, b, c and d are numbers representing the relative molar amounts of units (V), (VI), (VII) and (VIII), respectively, in the polyester, and where a is approximately equal to b+c; b is in the range of from about 0.5 to about 0.8; c is in the range of from about 0.5 to about 0.2; and d is in the range of from about 1 to about 7.

2. The polyester blend of claim 1 wherein the ratio of polyester (a) to polyester (b) is approximately 1.5 to 9:1.

3. The polyester blend of claim 1 wherein the mole ratio of monomer units of polyester (a) fall within the compositional ranges selected from the group consisting of areas A and B in the triangular phase diagram of FIG. 1, and the mole ratios of monomer units of polyester (b) fall within the compositional range defined by area C of the phase diagram of FIG. 2.

4. The polyester blend of claim 2 further comprising 30 wt. % glass fibers and having a heat distortion temperature of at least 240° C. when measured under a load of 264 psi.

* * * * *